(12) United States Patent
Yen (10) Patent No.: US 12,505,733 B2
(45) Date of Patent: Dec. 23, 2025

(54) CLOUD-BASED ROADWAY EQUIPMENT MONITORING SYSTEM

(71) Applicant: HUNG MING INFORMATION CO., LTD., Taichung (TW)

(72) Inventor: Chia Chun Yen, Taichung (TW)

(73) Assignee: Hung Ming Information Co., Ltd., Taichung (TW)

( * ) Notice: Subject to any disclaimer, the term of this patent is extended or adjusted under 35 U.S.C. 154(b) by 156 days.

(21) Appl. No.: 18/475,903

(22) Filed: Sep. 27, 2023

(65) Prior Publication Data

US 2024/0346919 A1 Oct. 17, 2024

(30) Foreign Application Priority Data

Apr. 14, 2023 (TW) .................................. 112114113

(51) Int. Cl.
*G06F 15/173* (2006.01)
*G08G 1/01* (2006.01)

(52) U.S. Cl.
CPC .................................. *G08G 1/0116* (2013.01)

(58) Field of Classification Search
CPC .................................................... G08G 1/0116
USPC .......................................................... 709/224
See application file for complete search history.

(56) References Cited

U.S. PATENT DOCUMENTS

| 7,113,865 | B2 * | 9/2006 | Ignatin | G08G 1/09 455/456.1 |
| 7,439,853 | B2 * | 10/2008 | Tengler | G08G 1/096716 340/901 |
| 9,371,099 | B2 * | 6/2016 | Lagassey | B62D 41/00 |
| 10,140,868 | B1 * | 11/2018 | Lei | B60W 50/14 |
| 10,692,365 | B2 * | 6/2020 | Ran | G08G 1/096725 |
| 10,916,129 | B2 * | 2/2021 | Castelli | H04W 76/10 |
| 11,113,956 | B1 * | 9/2021 | Gunter | G01N 27/121 |
| 11,447,152 | B2 * | 9/2022 | Ran | G08G 1/0145 |
| 11,689,697 | B2 * | 6/2023 | Zhang | G06V 20/52 348/149 |
| 11,702,081 | B2 * | 7/2023 | Bai | G08G 1/096775 701/117 |
| 11,816,981 | B2 * | 11/2023 | Dulberg | G08G 1/0116 |
| 11,962,459 | B1 * | 4/2024 | Mashuryan | H04L 67/12 |
| 12,057,011 | B2 * | 8/2024 | Jin | H04L 63/1441 |
| 12,200,063 | B2 * | 1/2025 | Yen | H04L 67/12 |
| 2002/0150050 | A1 * | 10/2002 | Nathanson | H04L 69/327 370/254 |
| 2002/0177942 | A1 * | 11/2002 | Knaian | G08G 1/02 340/907 |
| 2009/0201380 | A1 * | 8/2009 | Peaslee | H04N 19/51 348/208.4 |

(Continued)

*Primary Examiner* — Alicia Baturay
(74) *Attorney, Agent, or Firm* — Rosenberg, Klein & Lee (57) ABSTRACT

The present invention relates to a cloud-based roadway equipment monitoring system that mainly provides and constructs a plurality of servers to receive and record the return data transmitted from all roadway equipment, such as vehicle detector, changeable message sign, automatic vehicle identification, traffic signal controller, electronic tag and more, within a specific area through a router monitoring data device that replaces the existing internet-connected router-modem devices. The present invention can monitor, record, and prevent hacker invasion to enhance the availability of devices of the roadway equipment and help the traffic control center to clarify responsibility of equipment vendors.

9 Claims, 10 Drawing Sheets

(56) References Cited

U.S. PATENT DOCUMENTS

| | | | |
|---|---|---|---|
| 2011/0112720 A1* | 5/2011 | Keep | B60R 16/02 |
| | | | 340/500 |
| 2011/0288757 A1* | 11/2011 | Ignatin | G01C 21/3691 |
| | | | 701/119 |
| 2013/0063282 A1* | 3/2013 | Baldwin | B61L 29/282 |
| | | | 340/941 |
| 2014/0278030 A1* | 9/2014 | Meena | G08G 1/015 |
| | | | 701/117 |
| 2023/0136925 A1* | 5/2023 | Pu | G08G 1/0133 |
| | | | 701/117 |
| 2023/0237905 A1* | 7/2023 | Kellari | B60W 60/001 |
| | | | 701/24 |
| 2024/0062658 A1* | 2/2024 | Ucar | G08G 1/096725 |
| 2024/0212489 A1* | 6/2024 | Eldessouki | H04W 4/38 |
| 2024/0346918 A1* | 10/2024 | Yen | H04L 45/60 |
| 2024/0348656 A1* | 10/2024 | Yen | H04L 63/20 |

* cited by examiner

FIG.10
PRIOR ART

CLOUD-BASED ROADWAY EQUIPMENT MONITORING SYSTEM

1. FIELDS OF THE INVENTION

The present invention relates to the domain of roadway equipment management, especially the technical scope of a cloud-based roadway equipment monitoring system.

2. DESCRIPTIONS OF RELATED ART

Generally, roadways are equipped with a few devices and equipment, including vehicle detector (VD), changeable message sign (CMS), automatic vehicle identification (AVI), traffic signal controller (TC), detector of the electronic tag (eTag) of an electronic toll collection system, wherein the VD collects data of traffic flows; the CMS posts messages through the communication transport network in order to provide road condition information, traffic propaganda or relevant messages to road users; the AVI identifies and records the time and license plate of each vehicle that passes by the detection point; the TC equipment controls the operation of red, yellow, green traffic lights at the intersection; the eTag detector is used to read data from electronic tags.

Figure 10:
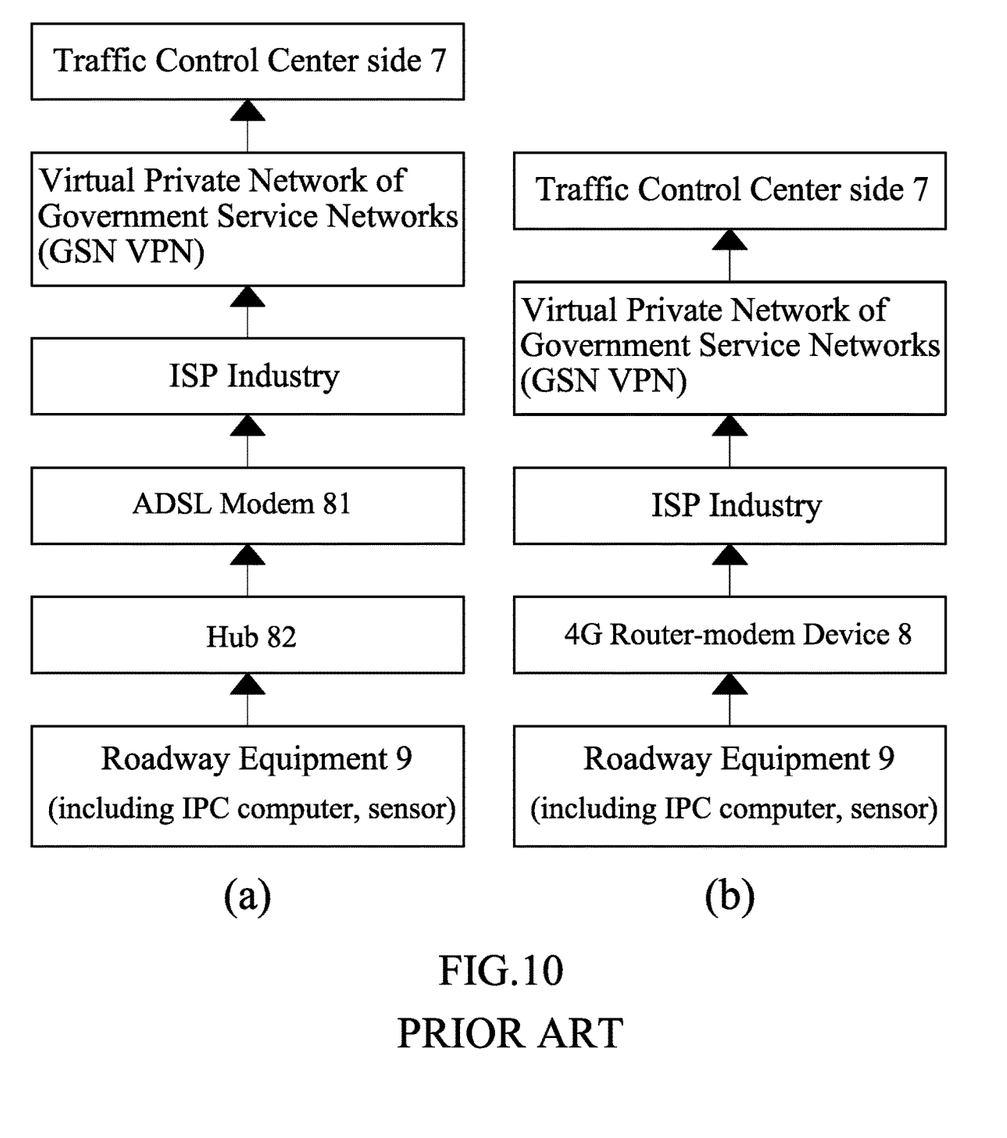
FIG. 10 is a schematic diagram of the internet-connected pathway for returning data of conventional roadway equipment.

As shown in FIG. 10, a roadway equipment 9 currently can control or return data of the traffic and road conditions, detected by the roadway equipment 9 at the site, back to the traffic control center side 7 through a communication network equipment (for example, modem 8) controlled by the traffic control center side 7, which is constructed by the government public sector. The transmission pathway is to first deliver the return traffic data, collected by the roadway equipment 9, to the virtual private network of government service networks (GSN VPN) to the traffic control center side 7 through wired network or wireless network methods and using ADSL or a 4G router-modem device 8; the last step is to transmit the return data to the traffic control center side 7.

However, the roadway equipment 9 are lack of information security management and can easily become a hacking target. Unused network ports can be a channel easily attacked by hackers. For example, after being infected with virus, a system of traffic control center side 7 stops functioning partially or entirely, or text contents of CMS equipment is altered. Therefore, the existing transmission methods of the roadway equipment 9 for returning traffic data to the control center side need to be improved.

Furthermore, due to the hot and humid summer weather, the roadway equipment 9 are easily overheated and experience system crash; the mechanic components deteriorate faster than those installed indoors, resulting in challenges in and test of the availability of the roadway equipment 9. According to the author's 1133 data records of maintenance logs on power blackout and reboots during the year of 2022, 726 records show that the systems return to a normal operation after blackout/reboot. The aforementioned device of blackout/reboot is located in the equipment side, the maintenance personnel must arrive at the site in person in order to carry out the blackout/reboot action which consumes maintenance manpower significantly.

Furthermore, the traffic control center sides 7 constructed by government public sectors currently are unable to identify the condition of the roadway equipment 9 of the equipment side in time in order to notify and dispatch relevant responsible vendors to maintain the problematic equipment.

SUMMARY OF THE INVENTION

In view of the aforementioned problems of the existing roadway equipment maintenance and management, authors of the present invention invent a cloud-based roadway equipment monitoring system. The main objective of the present invention is to provide a cloud-based roadway equipment monitoring system that has higher level of information security protection and device state of a monitoring equipment. The secondary objective of the present invention is to provide a cloud-based roadway equipment monitoring system to improve the availability and maintenance efficiency of the device of the equipment side. One additional objective of the present invention is to provide a cloud-based roadway equipment monitoring system for the traffic control center to identify responsibilities of the equipment vendors.

In order to achieve the aforementioned objectives, the following technical mean can be applied that uses a cloud-based roadway equipment monitoring system, which is used together with a plurality of router monitoring data devices, comprising a communication server, a queue server, a logical server, and a web server that use a custom-made communication protocol to maintain networking among servers, wherein the plurality of router monitoring data devices provide network connection for the roadway equipment of the equipment side through wired network or wireless network and return data of the roadway equipment back to the traffic control center side based on contents of the safety checklist of the built-in electronic device identification and network address; a communication server comprises a communication receiving program in order to receive return data of the roadway equipment transmitted by the plurality of router monitoring data devices and then compress those return data prior to being transmitted to a queue server; the queue server receives the compressed packets transmitted by the communication server and sets those packets in queue based on time-stamp to be processed by the logical server; the logical server uncompresses the compressed packets transmitted by the queue server and further comprises a data analysis program that analyzes the uncompressed packets and transmits the analysis results to a database server for storage; and the web server comprises, but not limited to, an user interface for accessing information stored in the database server and provides functions for issuing commands to the plurality of router monitoring data devices.

For each of the plurality of router monitoring data devices further comprises a communication module, a receiver module, a whitelist database, and a judgement module. The control module is electrically connected with the judgement module and is further connected to a relay outside the device. The relay comprises a MCU unit and a relay switch; both ends of the MCU unit are electrically connected with the control module and the relay switch separately. Both ends of the relay switch are electrically connected with a power supply and the roadway equipment separately, in order to provide the function of initiating blackout/reboot of the device of the equipment side,     wherein the judgement module determines commands and conditions of abnormal communication of the equipment side that must be recorded; comparison is performed based on the safety checklist of electronic device identification and network address retrieved from the whitelist database; regardless whether a match is found or not, information of the operational actions of the roadway equipment is transmitted to a communication receiving program of the designated communication port;

wherein conditions of abnormal communication usually refer to line disconnection of the equipment side, line disconnection of routers, abnormal IP address addition, abnormal MAC address addition or/and abnormal communication port addition;

wherein the communication module only captures and transmits fixed packet headers to the communication receiving program of the designated communication port;

wherein the safety checklist of electronic device identification and network address is a list of communication ports and MAC addresses of IP addresses available for roadway equipment to plug in; the safety checklist of electronic device identification and network address is updated on a daily basis;

wherein, when the transmission pathway for the compressed packets between the communication server and the logical server involves different computer facilities, the compressed packets must be encrypted and un-encrypted;

wherein the data analysis program installed in the logical server comprises a packet parsing unit and an intelligent analysis unit; the packet parsing unit uses regular expression technology to quickly compare the specification of a received packets; if such a specification matches the specification of the communication protocol, then the packet is disassembled to get data of roadway equipment and then the intelligent analysis unit analyzes data of the roadway equipment specifically; if such a specification does not match the specification of the communication protocol, it is determined as "off protocol-specification";

wherein the intelligent analysis unit determines whether the roadway equipment that generates data is a CMS equipment or not; if the data is from a CMS equipment, the intelligent analysis unit then will determine whether the text contents contain certain special keywords; if there exists special keywords, it is determined as "off CMS-specification", an abnormal condition; and wherein if the intelligent analysis unit determines that the roadway equipment which generates data is not a CMS equipment, then the intelligent analysis unit will determine conditions of "abnormal equipment value", "detection value too small" and "no active reporting" of the roadway equipment separately.

Therefore, the present invention adopts the aforementioned technical means to achieve the following effects:

1. The present invention can monitor the return traffic data transmitted from the roadway equipment side in order to determine whether communications of the equipment is abnormal or not, for example, "line disconnection of equipment side", "line disconnection of routers", "abnormal IP address addition", "abnormal MAC address addition" and "abnormal communication port addition", and also determine abnormal conditions of equipment, including "CMS inconsistency", "off CMS-specification", "detection value too small", "no active reporting", and "off protocol-specification". In addition, the present invention updates the whitelist database on a daily basis, so that the present invention can determine whether return traffic data of the roadway equipment can be uploaded to the traffic control center based on the safety checklist of the electronic device identification and network address. The data transmission process can be encrypted when it is necessary in order to ensure safety and accuracy of the return traffic data.

2. When the roadway equipment of the equipment side may be overheated and experience system crash, the present invention can issue commands of blackout/reboot remotely to the aforementioned device, in order to improve the availability of the roadway equipment.

3. When the present invention monitors and detects abnormal conditions of communication and equipment, the present invention can help the traffic control center clarify responsibility of equipment vendors, notify and dispatch relevant vendors to maintain the problematic equipment in time. Therefore, safety, availability, and maintenance efficiency of roadway equipment are improved.

The present invention will become more fully understood from the detailed description given herein below for illustration only which thus does not limit the present invention, wherein:

DETAILED DESCRIPTION OF THE PREFERRED EMBODIMENT

Figure 1:
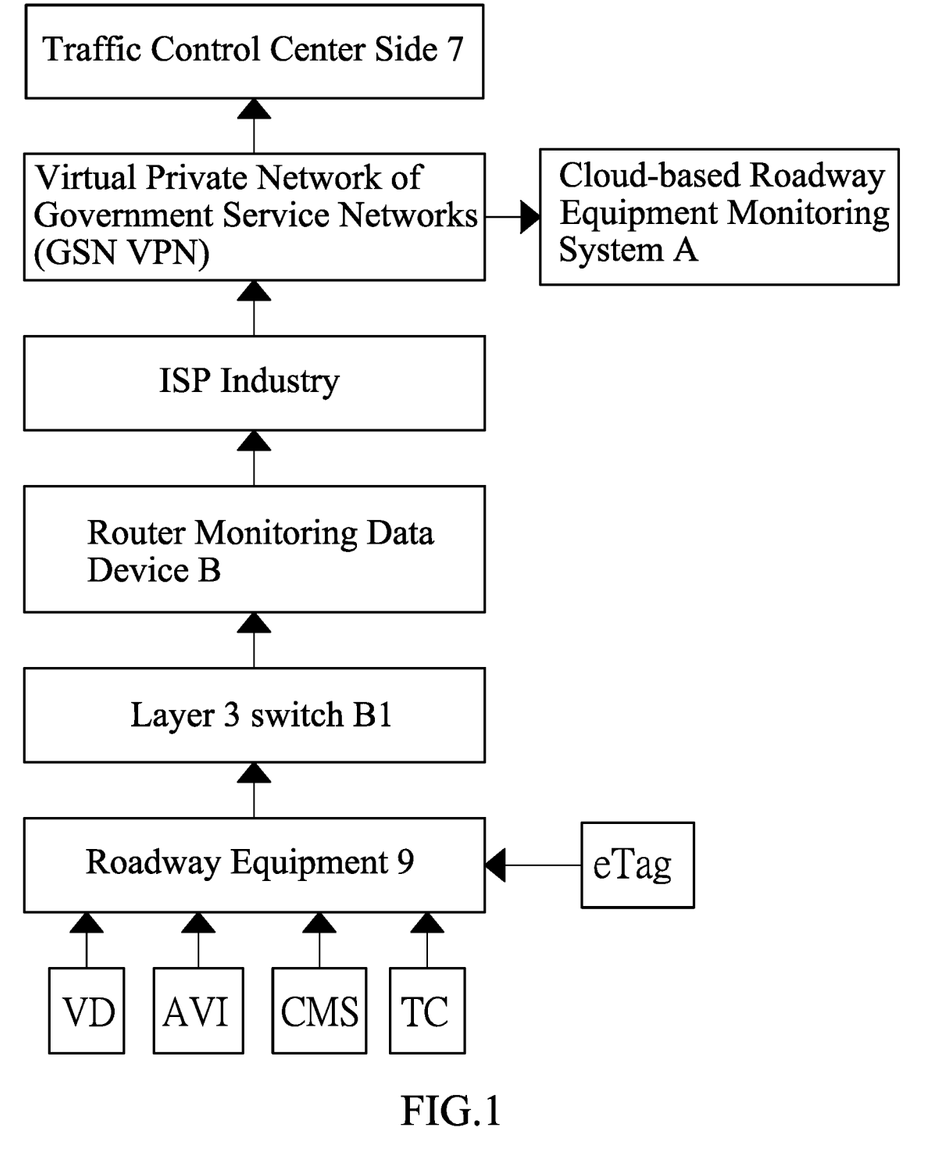
FIG. 1 is a schematic diagram of an embodiment of the cloud-based roadway equipment monitoring system of the present invention.
Figure 2:
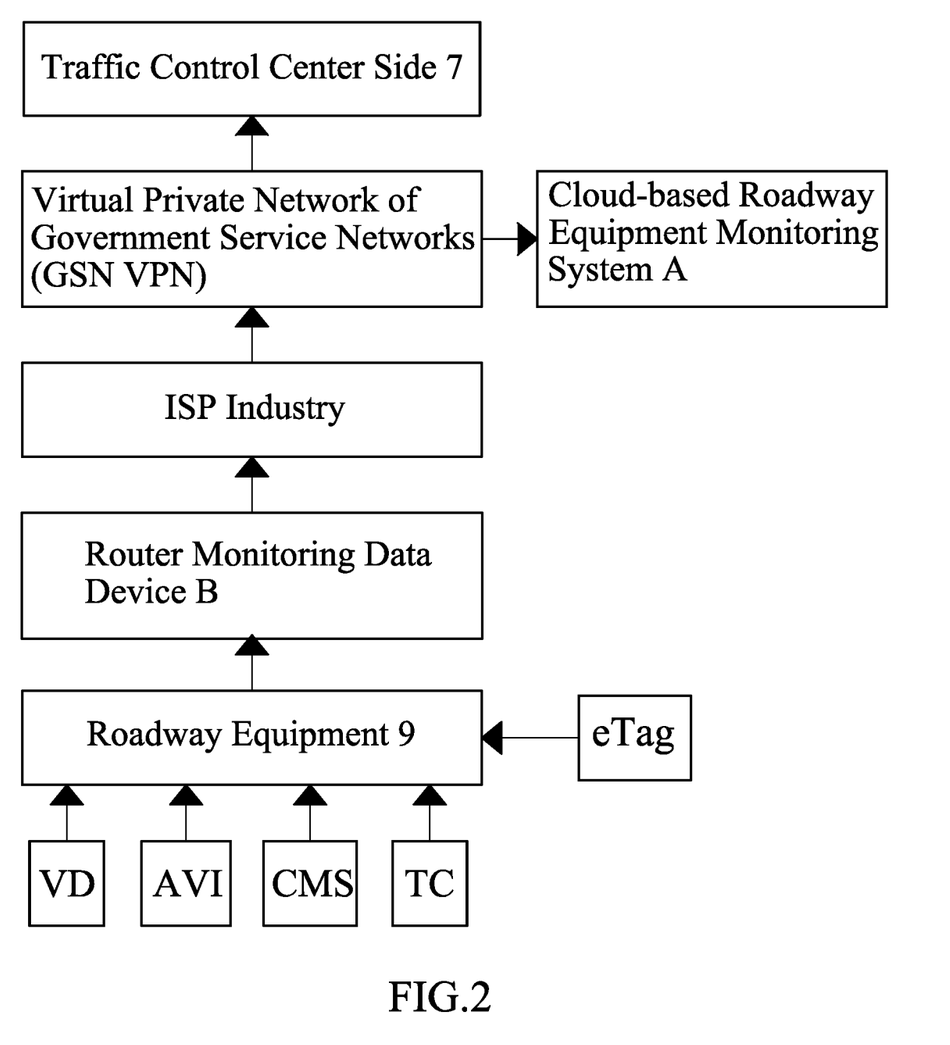
FIG. 2 is a schematic diagram of another embodiment of the cloud-based roadway equipment monitoring system of the present invention.

Please refer to FIG. 1 and FIG. 2. The present invention relates to a cloud-based roadway equipment monitoring system A that mainly provides and constructs a plurality of servers to receive and record the return data transmitted from all roadway equipment, such as vehicle detector (VD), changeable message sign (CMS), automatic vehicle identification (AVI), traffic signal controller (TC), electronic tag (e-Tag) and more, within a specific area through a router monitoring data device B that replaces the existing internet-connected router-modem devices. The present invention can monitor, record, and prevent hacker invasion to enhance the availability of devices of the roadway equipment 9 and help the traffic control center to clarify responsibility of equipment vendors.

First, the present invention must use a router monitoring data device B to replace the existing conventional internet-connected devices of roadway equipment. Usually, all roadway equipment within a specific area use two types of internet-connected equipment, ADSL modems 81 and 4G router-modem combos 8, as shown in FIG. 10. Therefore, the present invention needs to replace such two types of internet-connected equipment with router monitoring data devices B. The replacement methods are: for those using ADSL modems 81, as shown in FIG. 1, a router monitoring data devices B in conjunction with layer 3 switches B1 being used to replace the existing ADSL modems 81 and hubs 82; for those internet-connected equipment using 4G router-modem combos 8, as shown in FIG. 2, a router monitoring data devices B being used to replace the existing 4G router-modem combo 8.

Figure 3:
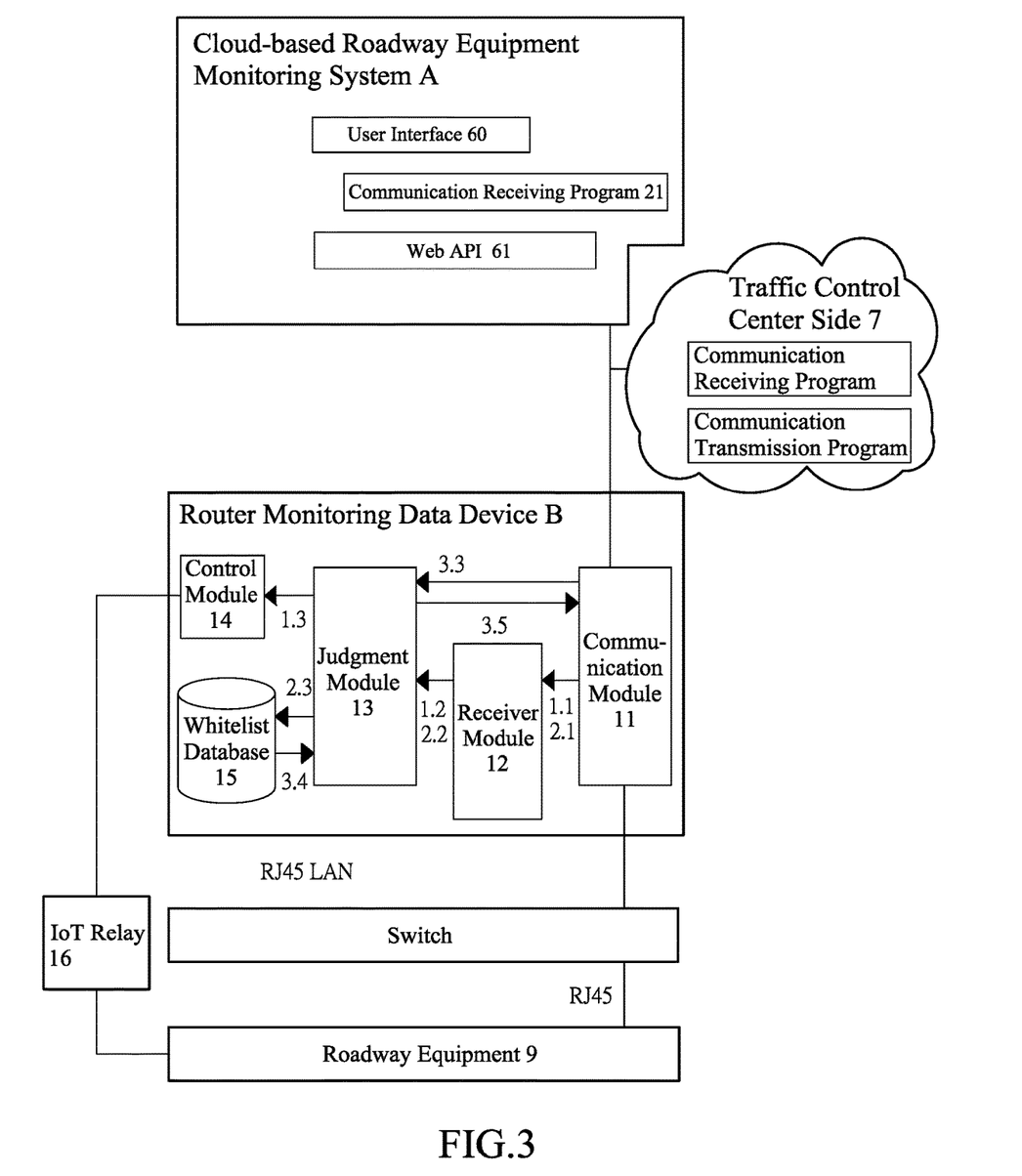
FIG. 3 is an architecture diagram of the router monitoring data device of the equipment side of the cloud-based roadway equipment monitoring system of the present invention.

The router monitoring data device B, as shown in FIG. 3, has not only those command functions of the existing internet-connected equipment, including receiving and transmitting return traffic data from the equipment side to the traffic control center side 7, but also functions of monitoring and uploading state of the equipment and communication conditions of the roadway equipment 9 of the equipment side through the virtual private network of government service networks (GSN VPN) to the cloud-based roadway equipment monitoring system A of the present invention for further analysis, recording, and management. As for whether the communication of the aforementioned monitoring equipment side is abnormal or not, as show in FIG. 4, monitoring conditions include "line disconnection of equipment side", "line disconnection of routers", "abnormal IP address addition", "abnormal MAC address addition" or/and "abnormal communication port addition". The router monitoring data device B is further equipped with an IoT relay, when it is applicable, in order to activate the blackout/reboot function by remotely control the roadway equipment 9 of the equipment side.

Figure 5:
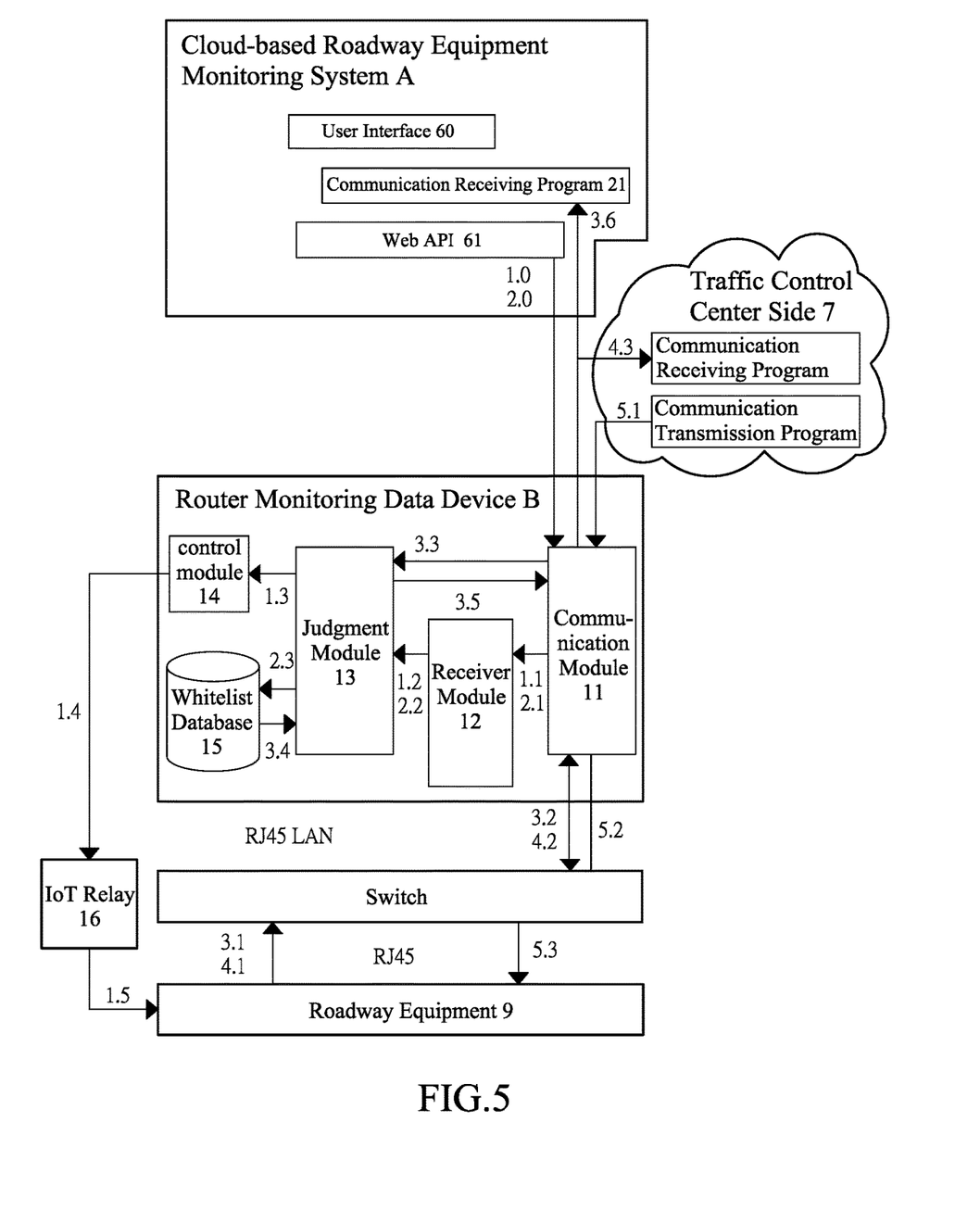
FIG. 5 is a overall action schematic diagram of the router monitoring data device of the equipment side of the cloud-based roadway equipment monitoring system of the present invention.
Figure 6:
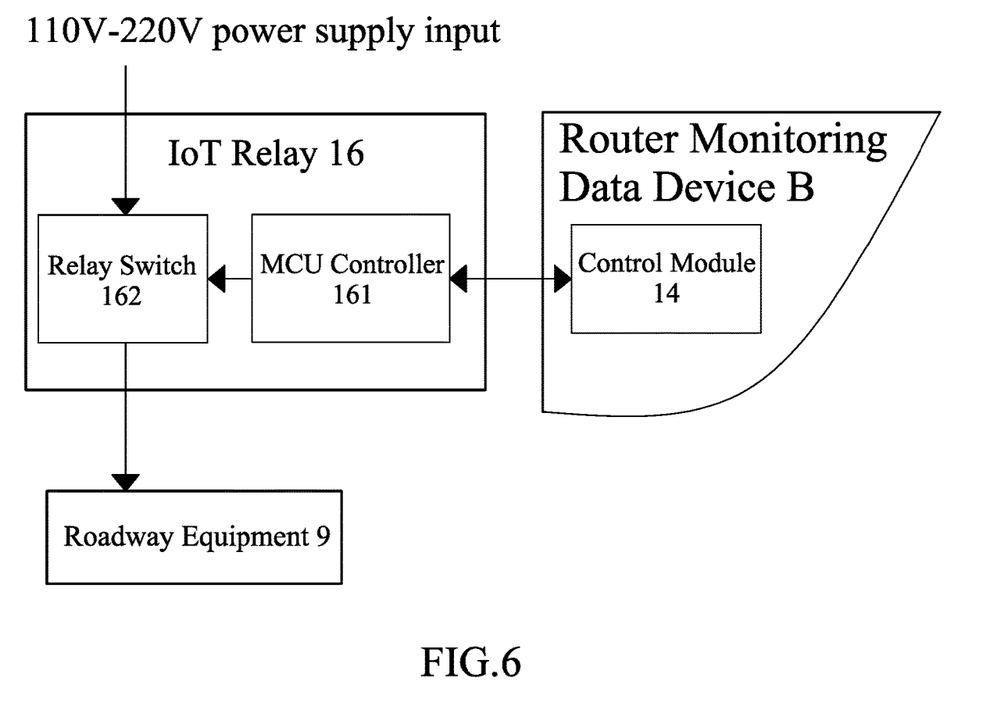
FIG. 6 an architecture diagram of the IoT relay of the equipment side of the cloud-based roadway equipment monitoring system of the present invention.

Please refer to FIG. 5 and FIG. 6. The router monitoring data device B comprises a communication module 11, a receiver module 12, a judgement module 13, a control module 14 and a whitelist database 15. Descriptions of the aforementioned components are provided as follows.

The communication module 11 transmits the return traffic data and receives packets of commands, wherein when the roadway equipment 9 delivers the equipment information through wired network or wireless network methods, the communication module 11 will transmit such information to the judgement module 13.

The receiver module 12 is electrically connected with the communication module 11 and performs functions of receiving packets of web API 61 push commands of the cloud-based roadway equipment monitoring system A.

The judgement module 13, which is electrically connected with the receiver module 12, provides functions of analyzing packets of the return traffic data transmitted by the roadway equipment 9 and determining command packets, wherein the judgement module 13 issues commands that determine whether the return information sent from the roadway equipment 9 shall be recorded and whether such information conforms an abnormal communication of the equipment side. If the condition is determined as an abnormal communication, the condition shall be checked by matching with a safety checklist of electronic device identification and network address (commonly known as the "whitelist" in the industry; hereinafter referred to as "the whitelist") retrieved from the whitelist database 15. Regardless whether a match is found or not, information of the operational actions of the roadway equipment 9 is transmitted by the communication module 11 to a communication receiving program 21 of the cloud-based roadway equipment monitoring system A at the designated communication port; only fixed IP packet headers are transmitted to prevent the communication in the equipment side from overload. In general, the electronic devices listed in the safety checklist of electronic device identification and network address refer to single chips, IPC computers, tablet computers, notebook computers, desktop computers.

The control module 14, which is electrically connected with the judgement module 13, is further connected to an IoT relay 16 outside the device, wherein the IoT relay 16 comprises a MCU unit 161 and a relay switch 163; both ends of the MCU unit 161 are electrically connected with the control module 14 and the relay switch 162 separately. Both ends of the relay switch 162 are connected with a 110V-220V power supply and the roadway equipment 9.

The whitelist database 15, which is electrically connected with the judgement module 13, has the function of storing the whitelists, wherein the whitelist is updated on a daily basis; the whitelist can provide the communication ports and Mac addresses of IP addresses available used by roadway equipment 9 to transmitting the return traffic data.

Figure 7:
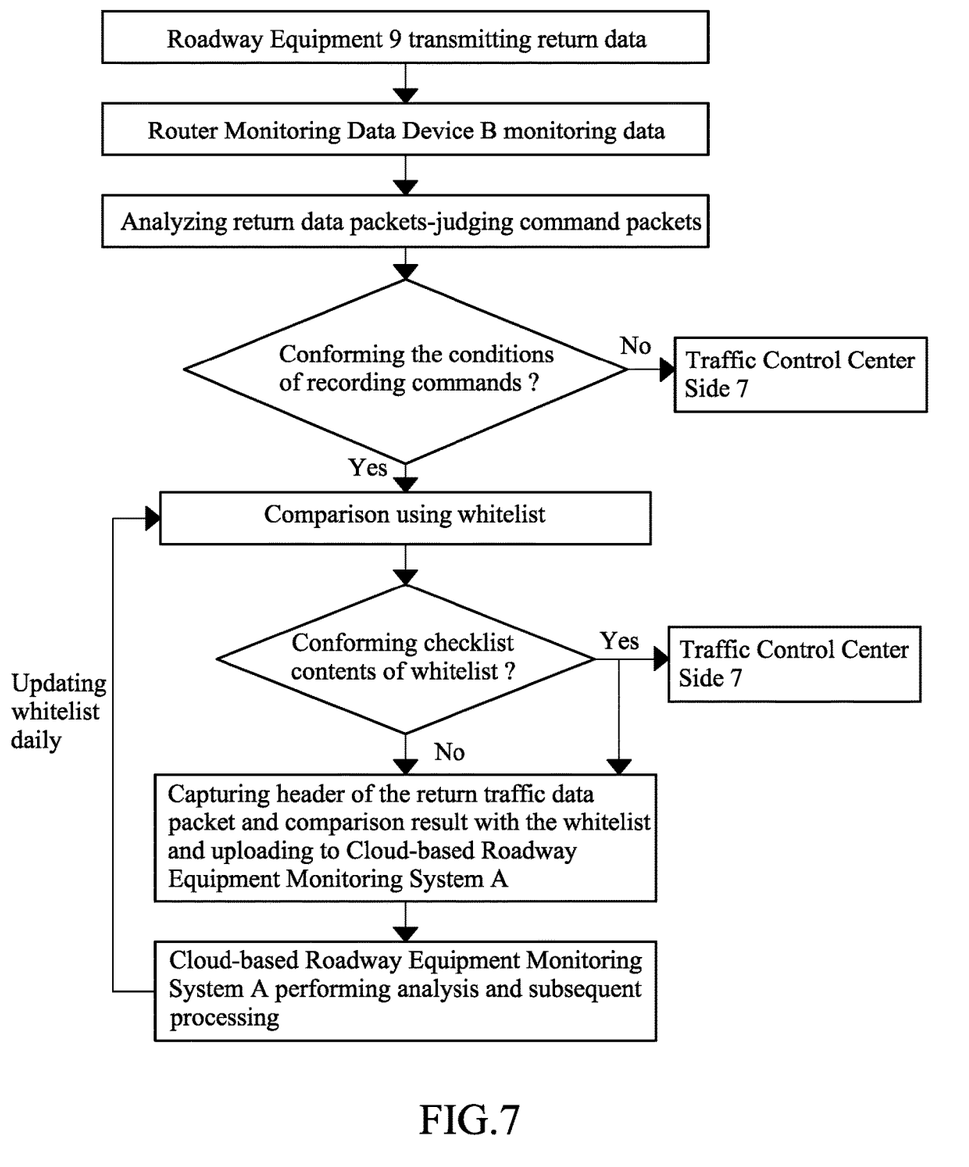
FIG. 7 is a flow chart of the front end operation to monitor return traffic data transmitted from the equipment side of the cloud-based roadway equipment monitoring system of the present invention.

Therefore, the router monitoring data device B mainly provides optimal solutions for roadway equipment 9 to transmit return traffic data of communication equipment, as shown in FIG. 5 to FIG. 7. When a roadway equipment 9 transmits return traffic data, the router monitoring data device B will monitor such data, analyzes packets of the return traffic data and command packets transmitted by the roadway equipment 9. If the packet of the return traffic data needs to be recorded, the judgement module 13 will retrieve the whitelist from the whitelist database 15 to process matching. Regardless whether a match is found within the whitelist or not, the header of the return traffic data packet and comparison result with the whitelist will be captured, together with information of the operational actions of the roadway equipment 9, are transmitted by the communication module 11 to a communication receiving program 21 of the cloud-based roadway equipment monitoring system A of the present invention at the designated communication port, so that the cloud-based roadway equipment monitoring system A can perform analysis and subsequent processing. For instance, if no match in IP or MAC PORT of the whitelist is detected, there is a strong possibility that the system is under attack by hackers. On the other hand, if the packet of return traffic data does not need to be recorded and has a match in the whitelist, the return traffic data will be transmitted of the roadway equipment 9 directly to the traffic control center side 7 by the communication module 11.

When the router monitoring data device B executes the blackout/reboot operation on the roadway equipment, the implementation pathway is from steps 1.0 to 1.5, wherein ⌈1.0: aperiodic push command$_1$→⌈1.1: accepting push command from Web API 61$_1$→⌈1.2: analyzing packet; judging command$_1$→⌈1.3: blackout/reboot command$_1$→⌈1.4: enabling IoT relay 16$_1$→⌈1.5: rebooting roadway equipment 9 after blackout₁. The aforementioned implementation pathway can reboot the roadway equipment 9 remotely.

When the router monitoring data device B is updating the whitelist, the implementation pathway is from steps 2.0 to 2.3, wherein ⌈2.0: daily update₁→⌈2.1: accepting push command from Web API 61₁→⌈2.2: analyzing packet; judging command₁→⌈2.3: updating IP communication port or MAC address of the whitelist₁. This implementation pathway can update the whitelist of the whitelist database 15 daily.

When the router monitoring data device B is transmitting return data of the equipment side and detects an abnormal communication condition, the implementation pathway is from steps 3.1 to 3.6, wherein ⌈3.1: reporting from equipment on equipment information (VD: traffic volume and velocity; CMS: changeable Message currently displayed . . . )₁→⌈3.2: data flowing from switch to router₁→⌈3.3: command of judging whether message shall be recorded, and whether message conforming conditions of abnormal communication, including line disconnection of equipment side, line disconnection of routers, abnormal IP address addition, abnormal MAC address addition and abnormal communication port addition₁→⌈3.4: Retrieving whitelist for matching₁→⌈3.5: regardless whether a match is found in whitelist, operational actions of equipment is transmitted through communication module 11₁→⌈3.6: message received by communication receiving program 21 of designated communication port₁. The improved router data device 1 will transmit a message of the abnormal condition to the management platform center side 6 in order to determine the state of the roadway equipment 9 and subsequent processing, such as blackout/reboot or maintenance dispatch. For one other example, when the improved router data device 1 is detecting whether it is an abnormal message, a PING command is usually issued to the roadway equipment 9 and the traffic control center side 7 in order to test whether line disconnection in communication exists. If an abnormal communication exists, then the improved router data device 1 will transmit this message to the management platform center side 6 for conducting subsequent maintenance.

When the router monitoring data device B is transmitting return data of the equipment side and does not detect an abnormal communication condition, the implementation pathway is from steps 4.1 to 4.3, wherein ⌈4.1: reporting from equipment on equipment information (VD: traffic volume and velocity; CMS: changeable Message currently displayed . . . )₁ . . . )₁→⌈4.2: data flowing from switch to router₁₁→⌈4.3: data received by traffic control center side 7₁. Normal and no abnormal return data are transmitted directly to the traffic control center side 7.

When the router monitoring data device B is executing commands issued by the traffic control center side 7, the implementation pathway is from steps 5.1 to 5.3, wherein ⌈5.1: traffic control center side 7 issuing commands₁→⌈5.2: transmitting data₁→⌈5.3: transmitting data to roadway equipment 9₁. In this implementation pathway, the traffic control center side 7 obtains the control right from the roadway equipment 9. Taking traffic signals as an example, the SET command is to change the interval time (in second) of traffic signals; the GET command is to get the time duration (in second) of the traffic signal at the time.

Figure 8:
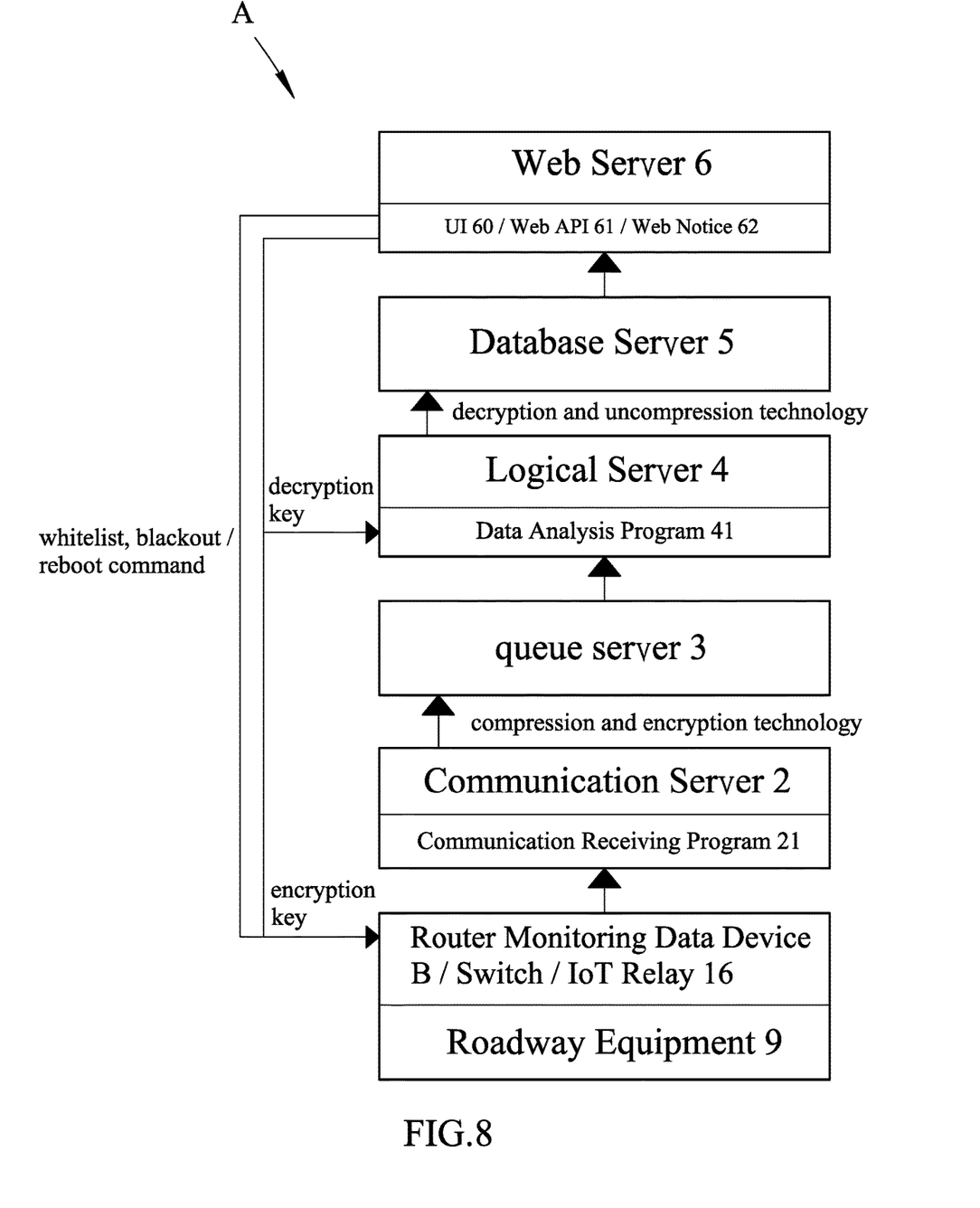
FIG. 8 is an overall architecture diagram of the cloud-based roadway equipment monitoring system of the present invention.

The cloud-based roadway equipment monitoring system A of the present invention, in conjunction with the router monitoring data device B, receives, records, analyzes, monitors, and manages return traffic data transmitted by the roadway equipment 9 of the equipment side, wherein the cloud-based roadway equipment monitoring system A, as shown in FIG. 8, comprises a communication server 2, a queue server 3, a logical server 4, a database server 5, and a web server 6 that use a custom-made communication protocol to maintain networking among servers. The aforementioned communication protocol is the "Third Edition of the Urban Area Traffic Control Communications Protocol" that defines fixed packet header, verification code, packet bit definition, and also defines methods of the communication handshake protocol, wherein The communication server 2 comprises a communication receiving program 21 in order to receive return data of the roadway equipment 9 transmitted by the plurality of router monitoring data devices B, and then compress those return data prior to being transmitted to a queue server 3. To compress the return data is to ease up the capacity and transmission volume of the queue server 3. When the queue server 3 and the communication server 2 are not in the same computer facility or when various services provided by the cloud-based roadway equipment monitoring system A of the present invention need to be installed in different computer facilities, the return data transmitted by the roadway equipment 9 must be compressed and encrypted prior to be sent to the queue server 3.

The queue server 3 provides a reliable transmission service of asynchronous messages, significantly reduces decoupling applications, improves efficiency, and has good reliability and scalability. The queue server receives the compressed packets transmitted by the communication server 2 and sets those packets in queue based on time-stamp to be processed by the logical server 4.

The logical server 4 uncompresses the compressed packets transmitted by the queue server 3 and further comprises a data analysis program 41 that analyzes the uncompressed packets and transmits the analysis results to the database server 5 for storage. Furthermore, when the logical server 4 receives encrypted compressed packets, the encrypted compressed packet must be decrypted and uncompressed in sequential order before analysis takes place; the analysis results are transmitted and stored in the database server 5 afterward.

Figure 9:
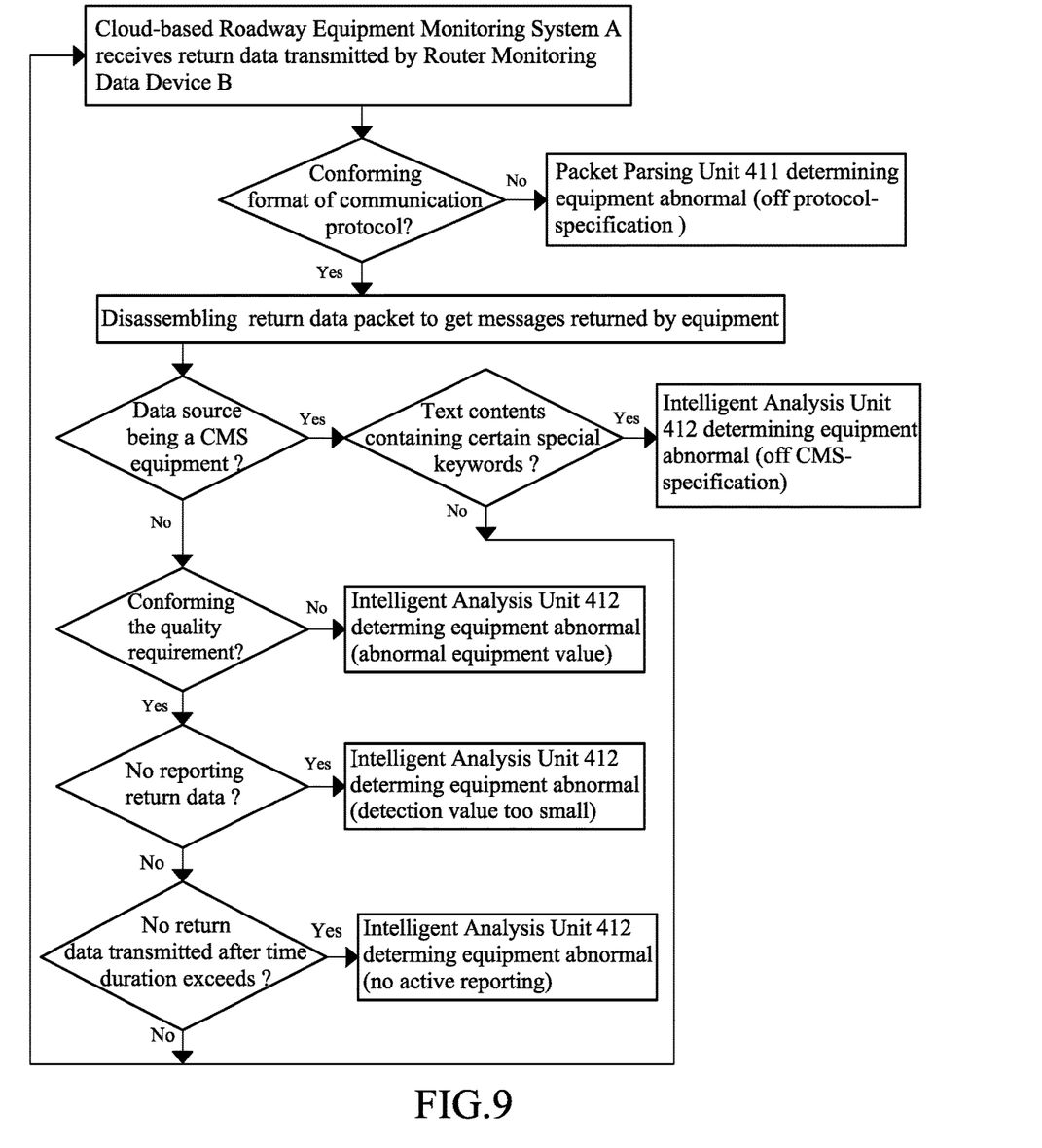
FIG. 9 is a flow chart of the back end operation to monitor return traffic data transmitted from the equipment side of the cloud-based roadway equipment monitoring system of the present invention.

Furthermore, as shown in FIG. 9, the data analysis program 41 comprises a packet parsing unit 411 and an intelligent analysis unit 412; the packet parsing unit uses regular expression technology to quickly compare the specification of a received packets, for example, packet header etc.; if such a specification matches the specification of the protocol, the packet is disassembled to obtain data of roadway equipment 9 and then the intelligent analysis unit 412 analyzes data of the roadway equipment 9 specifically; if such a specification does not match the specification of the protocol, it is determined as "off protocol-specification".

The web server 6 comprises a user interface 60 for accessing information stored in the database server 5 and, at the same time, provides functions for issuing commands or notifications to the router monitoring data device B, for example, Web API 62 and Web Notice, wherein Web API 62 provides an interface with the database server 5.

Figure 4:
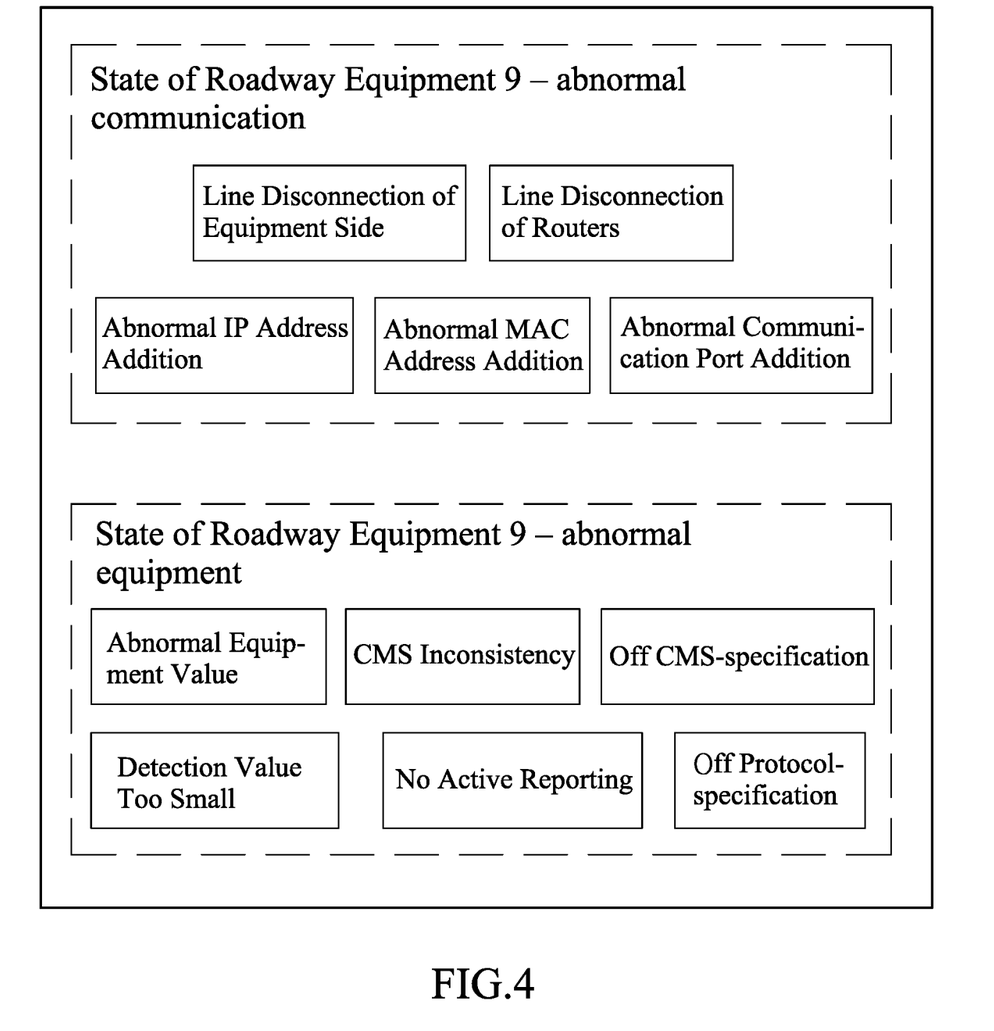
FIG. 4 is a schematic diagram of several forms of abnormal devices of the equipment side of the cloud-based roadway equipment monitoring system of the present invention.

Therefore, the present invention, in conjunction with the router monitoring data device B that replaces the conventional device of the equipment side, provides an optimal solution for the cloud-based roadway equipment monitoring system. The cloud-based roadway equipment monitoring system A of the present invention can monitor and record the roadway equipment 9 of the equipment side, prevent hacker invasion in order to enhance the availability of devices of the equipment side, and help the traffic control center to clarify responsibility of equipment vendors. Therefore, conditions of abnormal communication of the roadway equipment 9 to be monitors, as shown in FIG. 4 and FIG. 9, include but not limited to "line disconnection of equipment side", "line disconnection of routers", "abnormal IP address addition", "abnormal MAC address addition" and "abnormal communication port addition"; conditions of abnormal equipment include but not limited to "CMS inconsistency", "off CMS-specification", "detection value too small", "no active reporting", and "off protocol-specification".

Through the router monitoring data device B, the packet parsing unit 411 of the data analysis program 41 of the cloud-based roadway equipment monitoring system A of the present invention, as shown in FIG. 9, first will judge whether the specification of the received packet conforms the specification of the communication protocol or not. If there is a match, then the packet is disassembled. If there is not a match, it is determined as "off protocol-specification". Next, the intelligent analysis unit 412 determines whether the roadway equipment that generates data is a CMS equipment or not; if the data is from a CMS equipment, the intelligent analysis unit then will determine whether the text contents have consistency or contain certain special keywords; if there exists special keywords, it is determined as "off CMS-specification", an abnormal condition. The cloud-based roadway equipment monitoring system A usually will be pre-stored with text contents of CMS equipment to be announced by the traffic control center side 7 for better judging the consistency of text contents of CMS equipment. If the intelligent analysis unit 412 judges that the roadway equipment 9 which generates data is not a CMS equipment, then the intelligent analysis unit will then determine separately whether the abnormal condition is "abnormal equipment value", "detection value too small" and "no active reporting" of the roadway equipment 9.

Taking VD equipment as an example, after the packet parsing unit 411 disassembles the packet, data of the VD equipment are retrieved that contain data of current traffic volume, vehicle speed, etc. On the other hand, the intelligent analysis unit 412 analyzes whether VD equipment data conform the quality requirement. If the quality requirement is not met, then the equipment is abnormal (abnormal VD value).

After the packet parsing unit 411 disassembles the packet, the VD equipment data is accessed. When the equipment is analyzed, if the intelligent analysis unit 412 determines that the data does meet the requirement of one data record per minute and the lost time exceeds the quality duration time specified by the user, it is determined that the equipment is abnormal ("detection value too small").

For example, in general, when the traffic signal turns to a different color (green to yellow, yellow to red, red to green), the equipment is set to actively transmit return data. The router monitoring data device B will actively transmit such data to the cloud-based roadway equipment monitoring system A. When the aforementioned data is received, the intelligent analysis unit 412 determines the lost time (for example, the cycle of the traffic signal is 120 seconds; a cycle length refers to a complete sequence of signal phases of green to yellow, yellow to red, red to green). In addition, when the lost time exceeds 120 seconds and no return data actively transmitted is received, it is determined as equipment abnormal (no active reporting).

What is claimed is:

1. A cloud-based roadway equipment monitoring system; the cloud-based roadway equipment monitoring system being used together with a plurality of router monitoring data devices, and the cloud-based roadway equipment monitoring system comprising: a communication server; a queue server; a logical server; and a web server, the communication, queue, logical, and web servers using a custom-made communication protocol to maintain networking amongst one another;

wherein the plurality of router monitoring data devices provide network connections for roadway equipment of an equipment side through either one of a wired network or a wireless network and return data of the roadway equipment back to a traffic control center side based on contents of a safety checklist of a built-in electronic device identification and network address;

wherein the communication server includes a communication receiving program for receiving the return data of the roadway equipment transmitted by the plurality of router monitoring data devices and for subsequently compressing the return data transmitted by the plurality of router monitoring data devices into compressed data packets prior to being transmitted to the queue server;

wherein the queue server receives the compressed data packets transmitted by the communication server and sets the compressed data packets in a queue based on time-stamps for being processed by the logical server;

wherein the logical server uncompresses the compressed data packets transmitted by the queue server and includes a data analysis program for analyzing the uncompressed data packets and for generating and transmitting analysis results corresponding to the analysis of the uncompressed data packets to a database server for storage; and wherein the web server includes a user interface for accessing informational data at least corresponding to the analysis results generated by the logical server and stored in the database server and for providing functions for issuing commands to the plurality of router monitoring data devices.

2. The cloud-based roadway equipment monitoring system as claimed in claim 1, wherein each of the plurality of router monitoring data devices includes a communication module, a receiver module, a whitelist database, a control module, and a judgement module, wherein the control module is electrically connected with the judgement module and is further connected to a respective relay disposed outside a corresponding one of the plurality of router monitoring data devices, wherein the relay includes a MCU unit and a relay switch, and opposing ends of the MCU unit being, respectively, electrically connected with the control module of a corresponding one of the plurality of router monitoring data devices and the relay switch, and opposing ends of the relay switch being, respectively, electrically connected with a power supply and the roadway equipment of the equipment side for thereby initiating blackout/reboot of a corresponding device of the roadway equipment of the equipment side.

3. The cloud-based roadway equipment monitoring system as claimed in claim 2, wherein the judgement module determinately generates commands and conditions with respect to abnormal communication of the equipment side for being recorded and is further configured to execute comparisons based on the safety checklist of the built-in electronic device identification and network address, wherein the safety checklist of the built-in electronic device identification and network address is retrieved from the whitelist database and information with respect to operational actions of the roadway equipment is transmitted to a communication receiving program of a designated communication port irrespective of a result of the comparisons executed by the judgment module.

4. The cloud-based roadway equipment monitoring system as claimed in claim 3, wherein the conditions with respect to abnormal communication of the equipment side include at least one of line disconnection at the equipment side, line disconnection of routers, abnormal IP address addition, abnormal MAC address addition, and abnormal communication port addition.

5. The cloud-based roadway equipment monitoring system as claimed in claim 3, wherein the communication module captures and transmits fixed packet headers to the communication receiving program of the designated communication port.

6. The cloud-based roadway equipment monitoring system as claimed in claim 1, wherein the safety checklist of the built-in electronic device identification and network address includes a list of communication ports and MAC addresses of IP addresses available for the roadway equipment to plug into, and the safety checklist of the built-in electronic device identification and network address is updated daily.

7. The cloud-based roadway equipment monitoring system as claimed in claim 1, wherein the data analysis program installed in the logical server includes a packet parsing unit and an intelligent analysis unit, and the packet parsing unit being configured to use expression technology to compare a specification of a corresponding one of the uncompressed data packets, and if said specification matches a specification of a communication protocol, the corresponding one of the uncompressed data packets is disassembled to retrieve data of the roadway equipment, and then the intelligent analysis unit analyzes the retrieved data of the roadway equipment, and if the specification the corresponding one of the uncompressed data packets does not match the specification of the communication protocol, it is determined by the intelligent analysis unit to be an "off protocol-specification".

8. The cloud-based roadway equipment monitoring system as claimed in claim 7, wherein the intelligent analysis unit further determines whether the roadway equipment is a CMS equipment or not, and if it is determined that the roadway equipment is a CMS equipment, the intelligent analysis unit then determines whether text contents associated with the retrieved data of the roadway equipment contain predetermined keywords, and if the text contents contain the predetermined keywords, it is determined by the intelligent analysis unit to be an "off CMS-specification", which is an abnormal condition.

9. The cloud-based roadway equipment monitoring system as claimed in claim 7, wherein the intelligent analysis unit further determines whether the roadway equipment is a CMS equipment or not, and if the intelligent analysis unit determines that the roadway equipment is not a CMS equipment, then the intelligent analysis unit will further separately and selectively determine conditions of "abnormal equipment value", "detection value too small" and "no active reporting" with respect to the roadway equipment.

* * * * *